July 5, 1927.
C. SPIRO
1,634,803
PARKING DEVICE
Filed Jan. 13, 1927
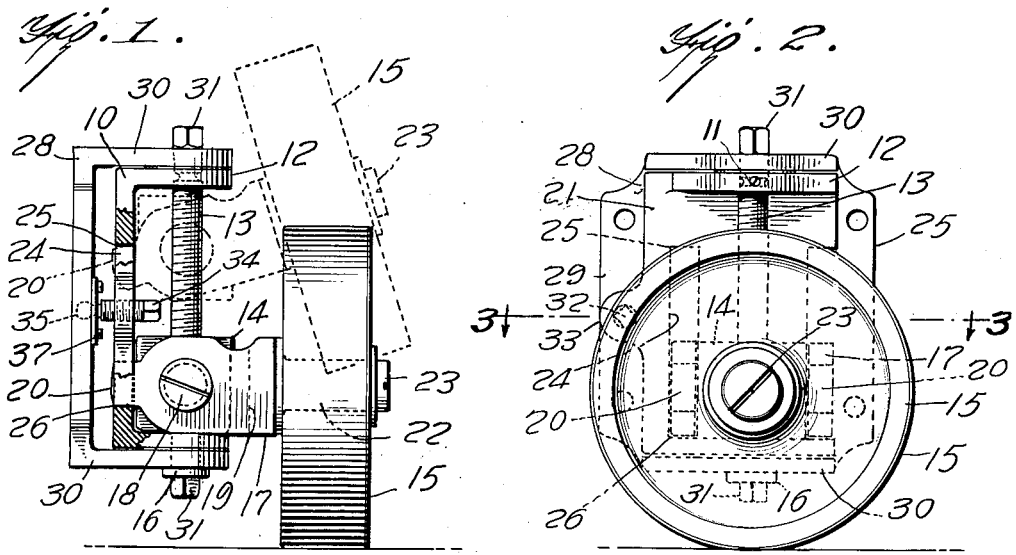
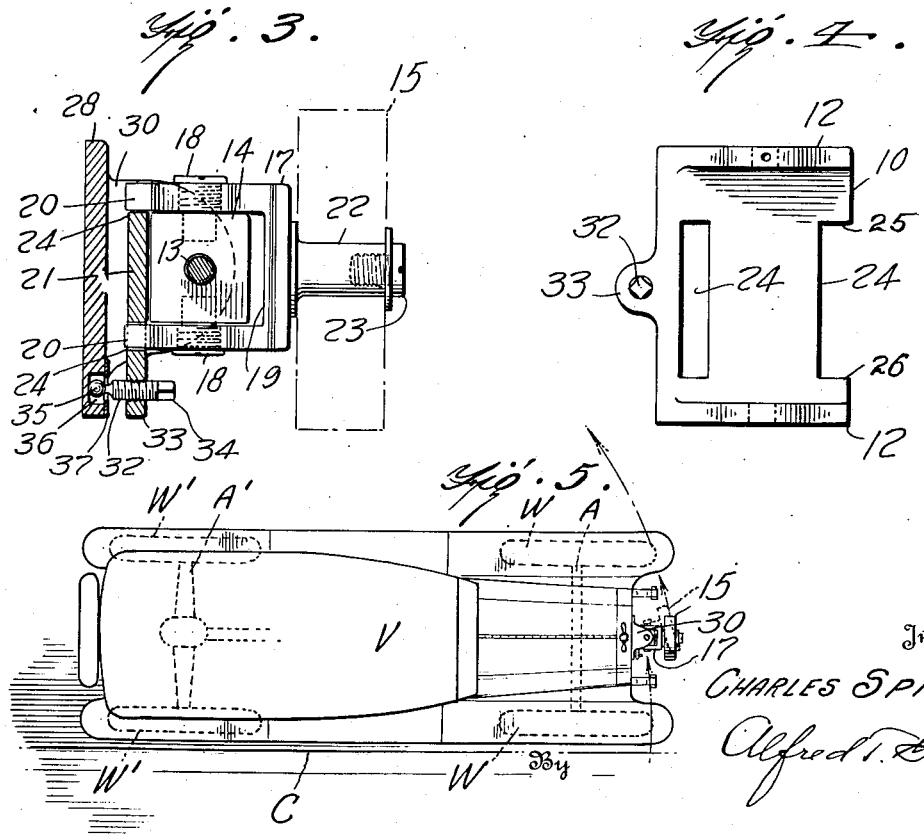
Inventor
CHARLES SPIRO,
Alfred I. Gage.
Attorney Patented July 5, 1927.

1,634,803

UNITED STATES PATENT OFFICE.

CHARLES SPIRO, OF NEW YORK, N. Y.

PARKING DEVICE.

Application filed January 13, 1927. Serial No. 160,886.

This invention relates to a parking device, and particularly to a construction in which a parking wheel is disposed at the forward portion of an automobile and at an angle to the length thereof, such wheel being adjustable to jack or lift the usual front traction wheels of the vehicle from the ground and to permit the front portion of the vehicle to swing in an arc having its center adjacent one of the rear wheels.

The increasing number of automobiles in use and the limited space available for parking the same in many sections has created conditions requiring the closest possible parking of cars to accommodate the greatest number in a given space. The width of the roadways and streets prevent in most instances diagonal or right angle parking, which relieves congestion to some extent, but to permit the maximum use of the roadway parking parallel to the side or curb is generally required. Under ordinary conditions it is practically impossible to closely park a car unless the space be materially greater than the car length, and even then considerable skill in the manipulation of the car is required. When parked close to adjacent cars in front and rear it is very difficult to depark or remove the car from such positions unless one of the adjacent cars be moved.

The present invention embodies a simple, substantial and efficient construction for obviating the objections stated by bodily shifting the front portion of the car laterally with one of its rear wheels as a pivotal point, and this is accomplished by a parking wheel jacked into engagement with the ground for the purpose of elevating the front vehicle wheels to permit such shifting movement. If the parking space be but slightly more than the length of the car the rear wheel thereof can be brought near the curb and the arc described by the front of the car requires but little space during the parking or deparking movement. Under some conditions it is desirable to move the car rearwardly during the bodily swinging of the front thereof and this may be accomplished by an adjustment of the parking wheel in a horizontal plane about the vertical feed screw on which the wheel is mounted. The parking wheel would thus be shifted from its normal position parallel to the front axle of the vehicle to a position at an angle thereto.

The space available at the front of an automobile for the location of the parking wheel and the vertical movement of its jack is limited, and it is therefore important to provide for the shortest possible vertical travel of the carrier block to clear the wheel from the ground, and for that reason this wheel is mounted to swing upward upon the block as it approaches the upper limit of its vertical movement. The vertical clearance of the wheel is materially increased by such a pivotal mounting and it is firmly supported in its inclined position when not in use.

The invention has for an object to provide a novel and improved construction including a rotatable feed screw held against axial movement and carrying a block upon which a parking wheel is mounted to operate in a path transversely of the vehicle.

A further object of the invention is to present a new construction of vertically adjustable parking wheel acting as a lifting jack for the front of the vehicle, with means for tilting said wheel rearwardly as it approaches the upward limit of its travel and supporting the same at its limit of downward travel.

Another object of the invention is to provide means by which a vertically adjustable parking wheel may be further shifted in a horizontal plane to change it from a normal position parallel to an axle of a vehicle to a position at an angle to such axle.

Other and further objects and advantages of the invention will be hereinafter set forth and the novel features thereof defined by the appended claims.

In the drawing—

Figure 1 is a side elevation, with parts broken away;

Figure 2 is a front elevation;

Figure 3 is a section on line 3—3 of Fig. 2;

Figure 4 is a detail elevation of the support; and

Figure 5 is a plan showing the application of the invention.

Like numerals designate like parts in the several figures of the drawing—

The invention is applicable to substantially all types of automobiles or similar vehicles and may be attached to any preferred portion thereof, for instance adjacent the front axle, by any desired means. As embodying the simplest form of the invention, the device comprises a support 10 of any desired configuration and properly secured to the vehicle V, Figure 5. This support is formed with horizontal pivoting flanges 12 in which a feed screw 13 is rotatably mounted and retained against axial movement by a head 16 at its lower end and a set screw 11 engaging its upper portion. Threaded upon this screw is a carrier block 14 upon which the parking wheel 15 is suitably mounted and normally disposed substantially parallel with the front axle A of the vehicle carrying the wheels W. The parking wheel 15 becomes a traction member and when brought into contact with the ground and the block fed downward the front wheels of the vehicle are lifted or jacked to permit a bodily lateral swinging of the front of the vehicle, relative to the curb or roadside C, with one of the rear wheels W' or the axle A' as a center of movement.

To permit rotative movement in a vertical plane of the wheel upon the block and to reduce the elevation necessary to clear the parking wheel from the ground in the upward travel of the block, I have provided an improved mounting comprising a bifurcated yoke 17 embracing the sides of the block and pivoted at 18 thereon, while the yoke is also spaced from the front of the block at 19 to permit the upward swing of the wheel rearwardly from its normal vertical plane when engaging the ground. From each of the bifurcations of the yoke a shoe 20 extends into contact with the rear wall 21 of the support 10, and is thus guided in its vertical travel upon the screw and resists the strain in operative travel of the parking wheel. The front of the yoke is provided with a journal 22 for the wheel 15 which is secured thereon by a cap-plate 23. The rear of the block is parallel to and adjacent the wall 21 so as to brace the block against rotative movement with the screw, Figure 3.

The shoes 20 at their point of contact with the wall 21 of the support rest in grooves or slots 24 therein which terminate at their upper ends in an abutment 25 and at their lower ends in a similar abutment 26. As the block approaches the upward limit of its travel the shoe 20 engages the abutment 25 and tilts the yoke rearwardly to incline the parking wheel, as shown by dotted lines in Figure 1. In the descending movement of the block the lower abutment engages beneath the shoe to swing the yoke and retain the wheel in a vertical plane as it engages the ground.

When the vehicle is parked in very close relation to an obstruction it is often desirable to provide for a forward or backward movement thereof coincident to the bodily swinging of its front end, and for this purpose means are provided for the horizontal shifting of the support and its wheel in an arc about the feed screw for the carrier block. A desirable construction for this purpose comprises frame 28 provided with the side flanges 29 for fixed attachment to the vehicle, preferably beneath the radiator thereof so that the parking wheel will normally lie parallel with the front axle. This frame is formed with horizontal flanges 30 at top and bottom, apertured for the pivotal support of the extended ends of the feed screw 13, which at opposite ends is formed with a wrench hold 31 for the application of any suitable tool to rotate the screw.

The support 21 has at one side of its pivot an adjusting screw 32 mounted in any desired manner, for instance in a lug 33 from the support to engage the fixed frame 28. The screw is formed with a wrench-hold 34 at its outer end to receive an operating device, and a ball bearing 35 at its inner end seated in a groove 36 in the frame 28 and retained therein by a cover plate 37. The groove is elongated and the cover slotted to permit the necessary play or movement in the rotative shifting of the support relative to the fixed frame.

The general operation of the invention will be obvious from the foregoing description, but it is noted that if an automobile be parked close to a curb, as indicated at C in Figure 5, the parking wheel is brought into contact with the ground to elevate the vehicle wheels at the front and permit a bodily swinging of the vehicle with the vertical center of the inner rear wheel or its axle as an axis. The front of the machine will thus be moved outward from the curb in a curved path requiring the minimum of space intermediate the machine parked next in front. If conditions require a rearward movement of the vehicle during the swinging of its front end, the parking wheel may be shifted in a horizontal plane and inclined to the front axle, as indicated by dotted lines in Figure 5. An opposite shift horizontally of this parking wheel would effect a forward movement of the machine. If the car is to be parked, instead of deparked as before described, the rear wheel is brought adjacent the curb and the front wheel elevated so the front of the machine may be bodily swung inward to the curb. If the space available is but little greater than the length of the machine the rear wheel can generally be brought into a position at an angle of 45 degrees or less to the curb and the inward swing of the front of the machine bodily causes the rear wheel to parallel the curb with the use of the least possible space for the purpose.

While the invention has been described as used for parking and departing automobiles, still it is equally applicable for moving such vehicles under other conditions, such as car storage in buildings or railway cars. The invention comprises a simple, efficient and economically constructed device adapted to be built of such stability as to render practical service and to be readily operable by the user of the car, who after backing into position has only to alight and jack the front wheels so that the body of the car is easily pushed laterally into parallel relation to the curb or roadside. The jack or parking wheel may be left in contact with the ground until the operator is ready to depark when the car is swung outward and the wheel withdrawn by a limited rotation of the feed screw.

While the details of the invention have been shown and described, it is not limited thereto, as changes and alterations may be made and parts omitted without departing from the spirit of the invention as recited in the following claims.

What I claim is:—

1. A parking device including a support, a rotatable screw retained thereon against axial movement, a travelling block held against rotation upon said screw, a journal extended from the block at an angle to the axis of the screw, and a traction wheel directly mounted upon said journal.

2. A parking device including a support, a rotatable screw retained therein against axial movement, a travelling block upon said screw, a traction wheel carried by the block at an angle to the wheels of a vehicle, and means for tilting said wheel out of a vertical plane during its rising movement.

3. A parking device including a support, a rotatable screw retained therein against axial movement, a traveling block held against rotation upon said screw, a traction wheel carried by the block, and means for adjutsing said support in a horizontal plane about the axis of the screw.

4. A parking device including a support, a rotatable screw retained therein against axial movement, a traveling block held against rotation upon said screw, a yoke pivoted to swing vertically upon said block and having a forwardly extending journal, and a traction wheel mounted on said journal.

5. A parking device including a support, a rotatable screw retained therein against axial movement, a traveling block upon said screw, a yoke pivoted upon said block and having a journal, a traction wheel mounted on said journal, a shoe extended from said yoke, and means upon said support to engage said shoe and tilt the wheel out of a vertical plane during its vertical travel.

6. A parking device including a support, a rotatable screw retained therein against axial movement, a traveling member upon said screw, a wheel carrier pivoted on said member, and means upon the carrier and support for controlling a tilting of the former during its vertical travel upon said screw.

7. A parking device including a support, a rotatable screw retained therein against axial movement, a traveling block upon said screw, a wheel carrier comprising a yoke pivoted upon said block and having a rearwardly extending shoe, and means upon the support to engage and actuate said shoe at the upper and lower limits of travel of the wheel carrier.

8. In a parking device, a support having pivoting flanges at its opposite ends and its rear wall formed with a guide groove, a screw mounted in said flanges against axial movement, a travelling block upon said screw, a wheel carrier comprising a yoke pivoted upon the block and having a rearwardly extending shoe disposed in said groove, and means at the upper end of said groove to actuate said shoe in the rising movement of the carrier.

9. A parking device including a fixed frame, a support pivoted thereon for horizontal adjustment, a feed screw retained in said support against axial movement, a block threaded upon said screw, a traction wheel upon the front face of the block, and means for retaining the support in horizontally adjusted position upon the frame.

10. A parking device including a fixed frame, a support pivoted thereon, a feed screw retained in said support against axial movement, a block threaded upon said screw and retained against rotation by said support, a traction wheel carried by the block, and means for adjusting the support and block in a horizontal plane to effect a rearward inclination of said wheel.

11. A parking device including a fixed frame, a support pivoted thereon, a feed screw retained in said support against axial movement, a block threaded upon said screw, a traction wheel carried by the block, means for adjusting the support and block in a horizontal plane, and means for automatically shifting said wheel out of a vertical plane when in elevated position.

12. A parking device including a fixed frame, a support pivoted thereon for horizontal adjustment, a feed screw retained against axial movement in said support, a parking wheel carrier mounted upon said screw for vertical adjustment, and an adjusting screw disposed at one side of the pivot of said support to engage the frame.

13. A parking device including a fixed frame, a support pivoted thereon for horizontal adjustment, a feed screw retained against axial movement in said support, a parking wheel carrier mounted upon said screw for vertical adjustment, an adjusting screw disposed at one side of the pivot of said support to engage the frame, and means for retaining said screw in contact with the frame.

14. A parking device including a fixed frame, a support pivoted thereon, a feed screw retained against axial movement in said support, a parking wheel carrier mounted upon said screw for vertical adjustment, and an adjusting screw threaded through the support at one side of its pivot and having a ball end seated in a groove in said frame.

15. A parking device including a fixed frame, a support pivoted thereon, a feed screw retained against axial movement in said support, a parking wheel carrier mounted upon said screw for vertical adjustment, an adjusting screw threaded through the support at one side of its pivot and having a ball end seated in a groove in said frame, and a slotted cover plate for said groove.

16. A parking device including a support having a guide at its rear wall, a feed screw secured in said support against axial movement, a block mounted upon said screw, and a parking wheel carrier disposed upon the block and having means traversing said guide to resist rotative movement of the block.

17. In a parking device, a parking wheel carrier, means for adjusting said carrier in a vertical plane, and means for tilting the carrier at an angle to such plane during its vertical travel.

18. In a parking device, a parking wheel carrier, means for adjusting said carrier in a vertical plane, means for tilting the carrier at an angle to such plane during its vertical travel, and means for shifting said carrier in a horizontal plane relative to the vertical adjusting means.

19. The combination with a vehicle, of a parking wheel disposed at the forward portion thereof in a plane transversely of the vehicle wheels, a device for raising and lowering said wheel relative to the ground, and means for shifting and retaining said wheel at an angle to its normal transverse position.

20. The combination with a vehicle, of a parking wheel disposed at the forward portion thereof parallel to the front axle of the vehicle, a device for raising and lowering said wheel relative to the ground, means for shifting said wheel at an angle to said axle, and means for tilting said wheel rearwardly during its raising movement.

In testimony whereof I affix my signature.

CHARLES SPIRO.